United States Patent
Tsuruta et al.

(10) Patent No.: US 9,630,662 B2
(45) Date of Patent: Apr. 25, 2017

(54) VEHICLE HAVING VEHICLE-BODY SIDE SURFACES PROVIDED WITH AIRFLOW PASSAGES

(71) Applicant: TOYOTA JIDOSHA KABUSHIKI KAISHA, Toyota-shi (JP)

(72) Inventors: Ryohei Tsuruta, Susono (JP); Shinnosuke Shimokawa, Susono (JP); Taro Tsukada, Susono (JP); Tateru Fukagawa, Fujisawa (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/041,218

(22) Filed: Feb. 11, 2016

(65) Prior Publication Data

US 2016/0244108 A1  Aug. 25, 2016

(30) Foreign Application Priority Data

Feb. 19, 2015  (JP) ................. 2015-031169

(51) Int. Cl.
  *B62D 35/02*  (2006.01)
  *B62D 25/24*  (2006.01)
  *B62D 25/20*  (2006.01)
  *B62D 37/02*  (2006.01)

(52) U.S. Cl.
  CPC ............. *B62D 35/02* (2013.01); *B62D 25/20* (2013.01); *B62D 25/24* (2013.01); *B62D 37/02* (2013.01)

(58) Field of Classification Search
  CPC .... B62D 25/025; B62D 25/24; B62D 35/008; B62D 35/02; B62D 37/02
  USPC .................... 296/180.1, 181.5, 209
  See application file for complete search history.

(56) References Cited

U.S. PATENT DOCUMENTS 8,899,660 B1  12/2014  Praskovskaya et al.

FOREIGN PATENT DOCUMENTS

| BE | WO 2013049900 A1 * | 4/2013 | ............. B62D 35/00 |
| DE | 102008019923 A1 * | 10/2009 | ............. B62D 35/008 |
| FR | 2532266 A1 * | 3/1984 | ............. B62D 35/008 |
| JP | 04-098689 | 8/1992 | |
| JP | 2006-248355 A | 9/2006 | |
| JP | 2008-260406 A | 10/2008 | |

* cited by examiner

*Primary Examiner* — Jason S Daniels
(74) *Attorney, Agent, or Firm* — Oblon, McClelland, Maier & Neustadt, L.L.P.

(57) ABSTRACT

A vehicle includes front wheels, rear wheels, a vehicle body, and closure mechanisms. The vehicle body has vehicle-body side surfaces each provided with an airflow passage. The airflow passage is located in a lower portion of the vehicle-body side surface. The lower portion is located between a corresponding one of the front wheels and a corresponding one of the rear wheels. The airflow passage extends from an underfloor space located below the vehicle body, to the vehicle-body side surface. The closure mechanisms are each configured to close the airflow passage of a corresponding one of the vehicle-body side surfaces that receives a crosswind while the vehicle is in motion. An extending direction of the airflow passage extending from the underfloor space toward the vehicle-body side surface is inclined toward a rear of the vehicle.

10 Claims, 3 Drawing Sheets

VEHICLE HAVING VEHICLE-BODY SIDE SURFACES PROVIDED WITH AIRFLOW PASSAGES

INCORPORATION BY REFERENCE

The disclosure of Japanese Patent Application No. 2015-031169 filed on Feb. 19, 2015 including the specification, drawings and abstract is incorporated herein by reference in its entirety.

BACKGROUND

1. Field of the Disclosure

The present disclosure relates generally to a structure of a vehicle body of a vehicle, such as an automobile. More specifically, the present disclosure relates to a structure of a vehicle body provided with airflow passages configured to generate an airflow in a vehicle-body underfloor space in order to reduce lift (lift effect or lift force) exerted on the vehicle body of a vehicle in motion.

2. Description of Related Art

Vehicle bodies of vehicles, such as automobiles, are usually designed to increase the flow rate of airflow in a vehicle-body underfloor space while a vehicle is travelling straight thereby reducing a lift effect exerted on a vehicle body. However, if a vehicle body is designed in consideration of only an airflow in a vehicle-body underfloor space flowing in the travelling direction of a vehicle that is travelling straight, the following problem may occur. When a crosswind impinges on the vehicle body and thus the yaw angle (the angle between the front-rear direction of the vehicle body and the direction of a resultant wind of a crosswind impinging on the vehicle body and a wind flowing in the front-rear direction of the vehicle body) increases, the flow rate of airflow in the vehicle-body underfloor space decreases. As a result, lift CL (non-dimensional force generated on the vehicle body) may increase. Especially, if a low-resistance vehicle is not designed to allow the air in a vehicle-body underfloor space to easily flow therethrough in the lateral direction of a vehicle body while the vehicle is travelling straight, the flow rate of airflow in the vehicle-body underfloor space may significantly decrease and thus lift may significantly increase. As lift CL (i.e., lift force) exerted on the vehicle body increases, the cornering force produced by a vehicle tire decreases, so that the steering performance is lowered. When the motion of the vehicle body is to be controlled using the cornering force produced by the vehicle tire through the control of, for example, steering, braking force, and driving force, a decrease in the cornering force lowers the performance (effect) of the control on the motion of the vehicle.

In view of this, there have been proposed structures for ensuring a sufficient flow rate of airflow in a vehicle-body underfloor space in order to reduce lift exerted on a vehicle body even when a crosswind impinges on the vehicle body. For example, Japanese Utility Model Application Publication No. 04-98689 describes a vehicle body structure in which a side air dam is fitted to each rocker panel located at a lower side portion of a vehicle body, at a position between front and rear wheels. This vehicle body structure is proposed in order to prevent an increase in lift due to a decrease in the flow rate of airflow in a vehicle-body underfloor space when a crosswind impinges on the vehicle body. The side air dam has a plurality of crosswind vent holes that extend from a vehicle-body side surface toward the vehicle-body underfloor space so as to be inclined toward the rear of the vehicle body.

In this structure, on both sides of the vehicle body, the extending direction in which each crosswind vent hole extends from the vehicle-body side surface toward the vehicle-body underfloor space is inclined toward the rear of the vehicle body. In this case, on the windward side, the extending direction of the crosswind vent holes substantially coincides with the direction of a resultant wind of a crosswind and a travel wind (force exerted on the vehicle in a direction opposite to the relative motion of the vehicle with respect to the surrounding air). Thus, on the windward side, an airflow easily enters the vehicle-body underfloor space from the vehicle-body side surface on the windward side through the crosswind vent holes. However, on the opposite side of the vehicle body from the side on which the air flow enters the vehicle-body underfloor space, that is, on the vehicle-body side surface on the leeward side, the extending direction of the crosswind vent holes differs from the direction of an airflow entering the vehicle-body underfloor space. Thus, the airflow that has entered the vehicle-body underfloor space collides against the wall of each crosswind vent hole located on the leeward side. In addition to such an airflow, airflows from various directions, such as an airflow from the outside of the side air dam (an airflow from the lower side of the crosswind vent holes on the windward side) and an airflow from the front side of the vehicle, enter the crosswind vent holes. Thus, the airflow easily becomes turbulent in the vehicle-body underfloor space. As a result, on the leeward side, it becomes difficult for the airflow to flow out of the vehicle-body underfloor space to the outside of the vehicle. Thus, in the vehicle-body underfloor space, the formation of an airflow from the windward side toward the leeward side in the direction of a crosswind becomes insufficient. This may cause a possibility that the effect of reducing lift using an airflow will not be sufficiently achieved.

BRIEF SUMMARY

The studies regarding airflow passages in vehicle-body side surfaces, conducted by the present inventors et al., have revealed that the effect of reducing lift is enhanced by allowing an airflow to sufficiently flow out of a vehicle-body underfloor space to the outside of a vehicle on the leeward side.

The present disclosure provides a vehicle having vehicle-body side surfaces provided with airflow passages.

The vehicle includes front wheels, rear wheels, a vehicle body, and closure mechanisms. The vehicle body has vehicle-body side surfaces each provided with an airflow passage. The airflow passage is located in a lower portion of the vehicle-body side surface. The lower portion is located between a corresponding one of the front wheels and a corresponding one of the rear wheels. The airflow passage extends from an underfloor space located below the vehicle body, to the vehicle-body side surface. The closure mechanisms are each configured to close the airflow passage of a corresponding one of the vehicle-body side surfaces that receives a crosswind while the vehicle is in motion. An extending direction of the airflow passage extending from the underfloor space toward the vehicle-body side surface is inclined toward a rear of the vehicle.

In the above structure, the extending direction of the airflow passage, which allows the air to flow between the underfloor space (i.e., vehicle-body underfloor space) and the vehicle-body side surface, extends from the underfloor space toward the vehicle-body side surface so as to be inclined toward the rear of the vehicle. Due to such an orientation of the airflow passage, when a crosswind impinges on the vehicle in motion, the flow rate of air flowing into the underfloor space from the outer surface of the vehicle body on the windward side in the direction of the crosswind (the vehicle-body side surface that receives the crosswind) becomes lower than that when an airflow passage extends along the direction of the crosswind. However, the air in the underfloor space flows out more easily from the vehicle-body side surface on the leeward side to the outside of the vehicle. Thus, in the presence of a crosswind, the turbulence of airflow in the underfloor space is reduced and the flow rate of airflow heading from the underfloor space toward the leeward side increases. As a result, the effect of reducing lift exerted on the vehicle body is enhanced.

The closure structure is configured to substantially eliminate inflow of air by closing the airflow passage on the windward side while a crosswind impinges on the vehicle in motion. Thus, airflow turbulence in the underfloor space is significantly reduced, so that energy loss due to airflow turbulence is reduced. Moreover, an airflow with little turbulence is allowed to flow out of the underfloor space toward the vehicle-body side surface on the leeward side of the crosswind at a higher flow rate.

In the above aspect of the present disclosure, the closure structure may be a shutter that is configured to passively (automatically) close the airflow passage on the windward side and passively (automatically) open the airflow passage on the leeward side in response to reception of a crosswind on the vehicle. Alternatively, the closure structure may be a shutter structure that detects the direction of a crosswind, and that actively closes the airflow passage on the windward side and opens the airflow passage on the leeward side based on the detected direction of the crosswind.

In the vehicle according to the above aspect, the airflow passage may have a tubular structure that passes through the vehicle body from the underfloor space to the vehicle-body side surface, the tubular structure having an opening that extends in a front-rear direction of the vehicle. Further, the airflow passage may include a fin extending in an up-down direction of the vehicle, a direction in which the fin extends from the underfloor space toward the vehicle-body side surface may be inclined toward the rear of the vehicle, and a space inside the tubular structure may be partitioned by the fin.

In the vehicle according to the above aspect, the airflow passage may have a tubular structure that passes through the vehicle body from the underfloor space to the vehicle-body side surface, and a direction in which the tubular structure extends from the underfloor space toward the vehicle-body side surface may be inclined toward the rear of the vehicle.

In the vehicle according to the above aspect, an area of a section of an airflow in the underfloor space may be larger than an opening area of the airflow passage, the section of the airflow being perpendicular to a direction in which the airflow is headed.

With this structure, before the airflow is discharged from the airflow passage, the airflow passes through the space of which the flow passage sectional area becomes narrower, and thus the flow velocity of the airflow is increased. As a result, the flow rate of airflow in the underfloor space is further increased due to the nozzle effect.

In the vehicle according to the above aspect, an outlet of the airflow passage may be configured such that an airflow flowing out of the outlet is headed substantially vertically upward in a side view of the vehicle.

With this structure, the effect of reducing lift exerted on the vehicle body is further enhanced.

In the vehicle according to the above aspect, an outlet of the airflow passage may be configured such that an airflow flowing out of the outlet is headed in a direction inclined toward the rear of the vehicle.

With this structure, an airflow flowing out of the vehicle side surface is headed toward the rear of the vehicle. This enhances the effect of generating an anti-yaw moment acting against a turning yaw moment generated by a crosswind.

In the vehicle according to the above aspect, the airflow passage may be configured such that an airflow flowing into the airflow passage from a front side of the vehicle flows out through flow passage.

With this structure, the flow rate of air in the underfloor space increases, which further enhances the effect of reducing lift exerted on the vehicle body.

According to the above aspect of the present disclosure, lift exerted on the vehicle body is reduced by allowing an airflow to smoothly flow through the underfloor space when a crosswind impinges on the vehicle in motion. In order to reduce lift, outflow (discharge) of air, from the underfloor space toward the outside of the vehicle on the leeward side in the direction of the crosswind, is more reliably achieved than intake of air into the underfloor space from outside the vehicle on the windward side in the direction of the crosswind. Thus, according to the aspect of the present disclosure, airflow turbulence in the underfloor space is reduced, and the flow rate of air flowing from the underfloor space toward the vehicle-body side surface on the leeward side in the direction of the crosswind increases. As a result, the effect of reducing lift exerted on the vehicle body is enhanced.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1A:
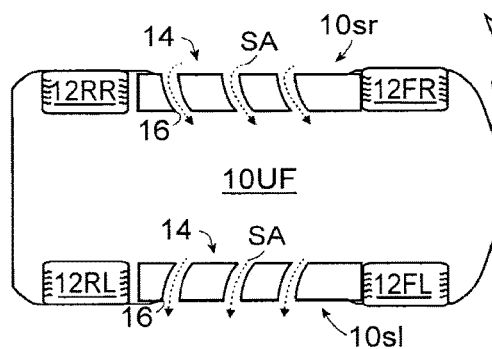
FIG. 1A is a sectional view schematically illustrating a vehicle, as viewed from below, the vehicle, of which configuration is applicable to embodiments of the present disclosure, having airflow passages having tubular structures extending from a vehicle-body underfloor space to each vehicle-body side surface.

Hereinafter, embodiments of the present disclosure will be described in detail with reference to the accompanying drawings. In the drawings, the same elements will be denoted by the same reference symbols.

Figure 1B:
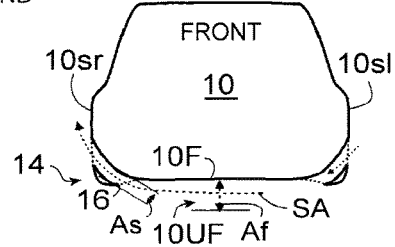
FIG. 1B is a sectional view schematically illustrating the vehicle in FIG. 1A, as viewed from the front side of the vehicle.

First, the basic structure and function of airflow passages will be described. An embodiment of the present disclosure relates to a structure for generating an airflow in an underfloor space of a vehicle body of a vehicle (hereinafter referred to as "vehicle-body underfloor space") that is travelling in a crosswind, in order to reduce lift exerted on the vehicle body. According to the embodiment of the present disclosure, in the foregoing structure, airflow passages are configured such that the air in the vehicle-body underfloor space more easily flows out of a vehicle-body side surface on the leeward side to the outside of the vehicle. As schematically illustrated in FIG. 1A and FIG. 1B, a vehicle body 10 of a vehicle, having a configuration applicable to the embodiments of the present disclosure, has right and left vehicle-body side surfaces 10*sr*, 10*sl* (each of which is an example of "vehicle-body side portion"). The right and left vehicle-body side surfaces 10*sr*, 10*sl* are provided with air inflow-outflow mechanisms 14 disposed between right and left front wheels 12FR, 12FL and right and left rear wheels 12RR, 12RL, respectively.

The air inflow-outflow mechanisms 14 have airflow passages 16 that provide communication between a vehicle-body underfloor space 10UF, located below a floor 10F of the vehicle body 10, and lower portions of the vehicle-body side surfaces 10*sr*, 10*sl*. In FIG. 1A and FIG. 1B, each of the airflow passages 16 extends from the vehicle-body underfloor space 10UF toward a corresponding one of the vehicle-body side surfaces 10*sr*, 10*sl* so as to be inclined toward the rear of the vehicle. In the case where the extending direction of each airflow passage 16 is inclined toward the rear of the vehicle, when a crosswind impinges on the vehicle in motion, the direction of the crosswind impinging on the vehicle body 10 and the extending direction of the airflow passages 16 differ from each other on the windward side (upper side in FIG. 1A). Thus, the flow rate of an airflow SA flowing into the vehicle-body underfloor space 10UF from the windward side decreases. On the other hand, the extending direction of the airflow passages 16 from the vehicle-body underfloor space 10UF toward the leeward side (lower side in FIG. 1A) substantially coincides with the direction of the crosswind impinging on the vehicle body 10. Thus, the airflow SA easily flows out of the vehicle-body underfloor space 10UF to the outside of the vehicle on the leeward side. Further, the crosswind does not directly enter the vehicle-body underfloor space 10UF from the windward side. Thus, the occurrence of collision of the airflow SA from the windward side, against the wall of each airflow passage 16 on the leeward side is reduced, and the airflow SA in the vehicle-body underfloor space 10UF is less likely to be turbulent. In this way, the flow rate of airflow SA in the vehicle-body underfloor space 10FR increases.

As schematically illustrated in FIG. 1B, it is preferable that the space through which the airflow SA passes and which extends from the vehicle-body underfloor space 10UF to each of the vehicle-body side surfaces 10*sl*, 10*sr* (outer surface of each vehicle body side portion), be formed such that a sectional area Af of a section of the vehicle-body underfloor space 10UF is larger than an opening area As of each airflow passage 16. The section of the vehicle-body underfloor space 10UF is perpendicular to the direction in which the airflow SA is headed. In FIG. 1B, a width of the airflow SA in the vehicle-body underfloor space 10UF is larger than a width of an opening of each airflow passage 16 in a direction perpendicular to the direction, in which the airflow SA is headed, and the front-rear direction of the vehicle body 10. With this structure, before the airflow SA is discharged from each airflow passage 16, the airflow SA passes through the space of which the flow passage sectional area becomes narrower, and thus the flow velocity of the airflow SA is increased. As a result, the flow rate of airflow SA in the vehicle-body underfloor space 10FR is further increased due to the nozzle effect.

Figure 1C:
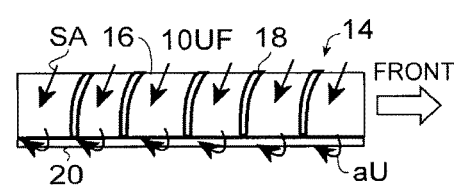
FIG. 1C and FIG. 1D are each a schematic view of airflow passages, similar to the airflow passages illustrated in FIG. 1, as viewed from above, FIG. 1C and FIG. 1D each illustrating an example in which the airflow passages are defined by partitioning a tubular structure by fins, the tubular structure being disposed at a lower side portion of a vehicle body and extending in the front-rear direction of the vehicle body, FIG. 1C illustrating an example where the direction of an airflow flowing out of the vehicle-body side surface is the upward direction, and FIG. 1D illustrating an example where the direction of an airflow flowing out of the vehicle-body side surface is inclined toward the rear of the vehicle body.
Figure 1D:
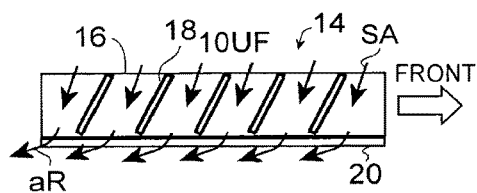

As illustrated in FIG. 1A, the airflow passages 16 may be defined by multiple tubular structures. Each of the tubular structures is located at a lower side portion of the vehicle body 10 and extends from the vehicle-body underfloor space 10UF toward a corresponding one of the vehicle-body side surfaces 10*sr*, 10*sl* so as to be inclined toward the rear of the vehicle body 10. As illustrated in FIG. 1C or FIG. 1D, the airflow passages 16 may be defined by partitioning the space in a tubular structure by fins 18. The tubular structure is located at the lower side portion of the vehicle body 10 and extends widely in the front-rear direction of the vehicle body 10. The fins 18 extend generally along the up-down direction of the vehicle body 10. Note that, each tubular structure passes through the vehicle body 10 from the vehicle-body underfloor space 10UF to a corresponding one of the vehicle-body side surfaces 10*sr*, 10*sl*.

Figure 1E:
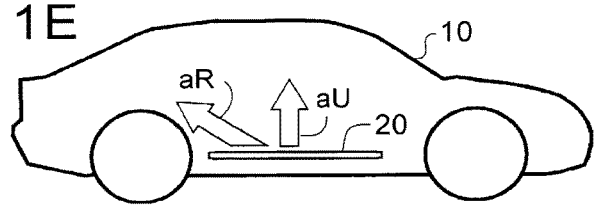
FIG. 1E is a side view schematically illustrating the vehicle illustrated in FIG. 1A.
Figure 1F:
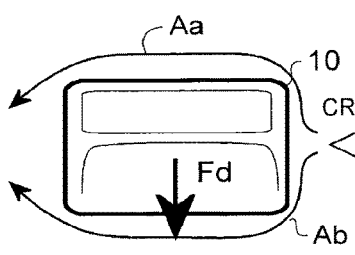
FIG. 1F is a schematic view of the vehicle as viewed from the front side of the vehicle, FIG. 1F illustrating airflows around the vehicle body when the direction of an airflow flowing out of the vehicle-body side surface is the upward direction.
Figure 1G:
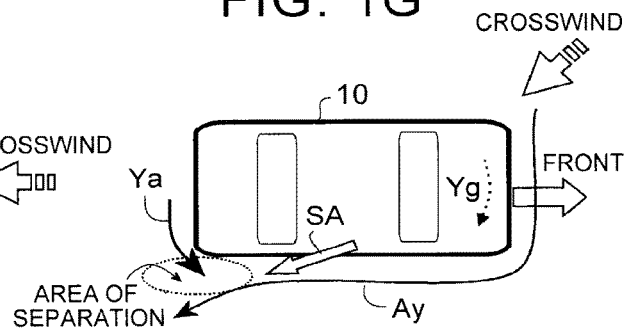
FIG. 1G is a schematic view of the vehicle as viewed from above, FIG. 1G illustrating airflows around the vehicle body when the direction of an airflow flowing out of the vehicle-body side surface is inclined toward the rear of the vehicle body.

Regarding the direction of an airflow flowing out of the vehicle-body side surface, the following has been found. At an outlet 20 of the airflow passages 16, from which an airflow flows out and which is located in a side portion of the vehicle body 10, the direction of a force exerted on the vehicle body 10 varies depending on the direction of an airflow flowing out of the outlet 20, as schematically illustrated in FIG. 1E. As will be described later as the result of a test for verifying the effect of the embodiments of the present disclosure, when the direction of an airflow flowing out of the outlet 20 is a substantially vertically upward direction aU, a crosswind impinging on the vehicle body 10 flows along two separate paths, that is, a path Aa on the upper side of the vehicle body 10 and a path Ab on the lower side of the vehicle body 10, as schematically illustrated in FIG. 1F. As a result, a downforce Fd that reduces lift exerted on the vehicle body 10 is more effectively obtained. On the other hand, when the direction of an airflow flowing out of the outlet 20 is a direction aR that is an upward direction inclined toward the rear of the vehicle body 10, as schematically illustrated in FIG. 1G, the airflow SA flowing out of the outlet 20 toward the rear of the vehicle body 10 on the leeward side separates an airflow Ay from the vehicle body 10 at a rear portion of the vehicle body 10 on the leeward side. The airflow Ay comes from the front side of the vehicle body 10 along the side portion on the leeward side. As a result, a negative pressure is generated in an area of separation, where the airflow Ay is separated from the vehicle body 10. Thus, an anti-yaw moment Ya acting against a turning yaw moment Yg, which is generated due to the crosswind, is generated at the rear portion of the vehicle body 10.

As illustrated in FIG. 1C and FIG. 1D, the direction of an airflow flowing out of the outlet 20 can be determined, for example, by setting the orientation of the fins 18 that define the airflow passages 16. As illustrated in FIG. 1C, when the fins 18 are disposed so as to extend substantially along the lateral direction of the vehicle body 10 at the outlet 20, an airflow that has flowed out of the outlet 20 is headed in the substantially vertically upward direction aU. As illustrated in FIG. 1D, when the fins 18 are disposed such that the outer edges of the fins 18 are inclined toward the rear of the vehicle body 10 at the outlet 20, an airflow that has flowed out of the outlet 20 is headed in the direction aR that is inclined toward the rear of the vehicle body 10. The orientation of the fins 18 may be set during the state of design or manufacturing of the vehicle body 10 such that an airflow flows out of the outlet 20 in a desired direction. Actuators that appropriately change the orientation of the fins 18 may be provided (see FIG. 3D).

Figure 2:
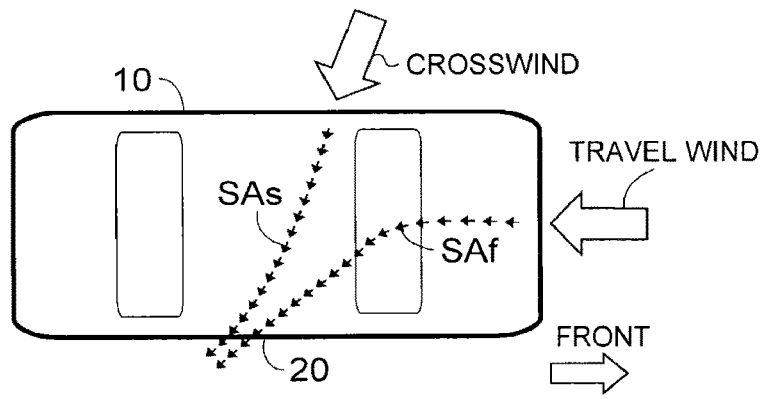
FIG. 2 is a schematic view of the vehicle as viewed from above, FIG. 2 illustrating airflows in a case where an airflow entering the vehicle-body underfloor space from the front side of the vehicle body is also caused to flow to a vehicle-body lateral side in one embodiment of the present disclosure.

Next, utilization of an airflow coming from the front side of the vehicle will be described. The vehicle in motion receives, in addition to a crosswind, a travel wind (force exerted on the vehicle in a direction opposite to the relative motion of the vehicle with respect to the surrounding air) coming from the front side of the vehicle. Thus, as schematically illustrated in FIG. 2, the airflow from the front side of the vehicle may also be introduced into the vehicle-body underfloor space 10UF, and this airflow, along with an airflow of a crosswind from the windward side of the vehicle side portion, may be discharged out of the airflow passages 16 on the leeward side. This structure contributes increases in the flow rate and flow velocity of an airflow in the vehicle-body underfloor space 10UF.

Next, closure of the airflow passages 16 on the windward side will be described. According to the result of the test for verifying the effect of the embodiments of the present disclosure, the following has been found. In the vehicle body 10 having the airflow passages 16 according to the foregoing embodiments of the present disclosure, if the airflow passages 16 on the windward side are closed when a crosswind impinges on the vehicle body 10, the effect of reducing lift exerted on the vehicle body 10 is enhanced. This is because, when the airflow passages 16 on the windward side are closed, an airflow no longer enters the vehicle-body underfloor space 10UF through the closed airflow passages 16, so that turbulence of an airflow headed from the vehicle-body underfloor space 10UL to the airflow passages 16 in the vehicle-body side surface is further reduced and the flow rate of airflow in the vehicle-body underfloor space 10UF increases.

Figure 3A:
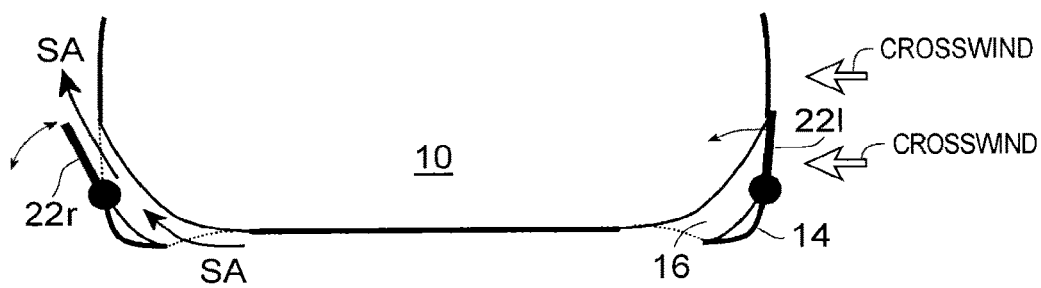
FIG. 3A is a schematic sectional view of a vehicle body lower portion as viewed from the front side of the vehicle, FIG. 3A illustrating a structure for passively (automatically) closing the airflow passages on the windward side in the direction of a crosswind and passively (automatically) opening the airflow passages on the leeward side in the direction of the crosswind in one embodiment of the present disclosure.

According to the result of the verification test, the vehicle body 10 may preferably have a structure (means) for closing the airflow passages 16 on the windward side in the direction of a crosswind impinging on the vehicle in motion. Thus, a vehicle according to one embodiment of the present disclosure includes shutters 22*r*, 22*l*, as a structure for closing the airflow passages 16, that are provided to the vehicle-body side surfaces 10*sr*, 10*sl* as schematically illustrated in FIG. 3A, the shutters 22*r*, 22*l* being configured to close the openings of the airflow passages 16. In the absence of winds or airflows, the shutters 22*r*, 22*l* are urged by, for example, springs so as to be pressed against the openings of the airflow passages 16. As illustrated in the left side of FIG. 3A, when the pressure of an airflow entering the airflow passages 16 from the vehicle-body underfloor space 10UF exceeds the urging force of the spring on the leeward side in the direction of the crosswind, the shutter 22*r* pivots outward in the lateral direction of the vehicle body 10 to open the openings of the airflow passages 16. On the other hand, the shutter 22*l* remains pressed against the vehicle-body side surface 10*sl* by the crosswind on the windward side in the direction of the crosswind (right side in FIG. 3A). Thus, the airflow passages 16 on the windward side are closed, whereas the airflow passages 16 on the leeward side are open.

Figure 3B:
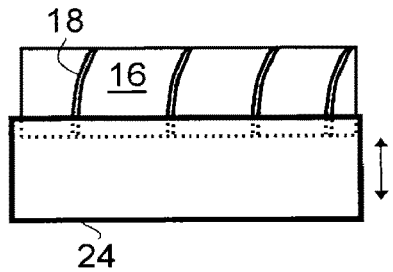
FIG. 3B and FIG. 3C are each a schematic view of an outlet of the airflow passages as viewed from the lateral side of the vehicle, FIG. 3B and FIG. 3C each illustrating a structure for actively closing the airflow passages on the windward side in the direction of a crosswind by closing a shutter and actively opening the airflow passages on the leeward side in the direction of the crosswind by opening a shutter in one embodiment of the present disclosure, FIG. 3B illustrating a state where the airflow passages on the leeward side in the direction of the crosswind are opened, and FIG. 3C illustrating a state where the airflow passages on the windward side in the direction of the crosswind are closed.
Figure 3C:
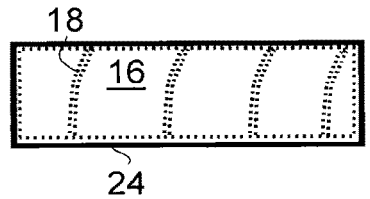

As schematically illustrated in FIG. 3B and FIG. 3C, shutters 24 may be provided as a structure for closing the airflow passages 16 according to another embodiment of the present disclosure. Each shutter 24 moves up and down actively, for example, in accordance with the operation of an actuator, such as an electric motor, at the openings of the airflow passages 16. In this case, the direction of a wind impinging on the vehicle may be detected by a prescribed device (means). Depending on the detected direction of the wind, the shutter 24 may be moved to such a position that the airflow passages 16 are opened on the leeward side as illustrated in FIG. 3B. On the windward side, as illustrated in FIG. 3C, the shutter 24 may be moved to such a position that the airflow passages 16 are closed. In FIG. 3B and FIG. 3C, dotted lines indicate the airflow passages 16 and the fins 18 when they are covered with the shutter 24. The device that detects the direction of a wind impinging on the vehicle may be a wind direction sensor (not illustrated), or a device (not illustrated) that determines whether or not the yaw rate and the roll rate are opposite in phase from each other. In this structure, when the yaw rate and the roll rate are opposite in phase from each other, it is determined that there is a crosswind in the direction of the roll rate.

Figure 3D:
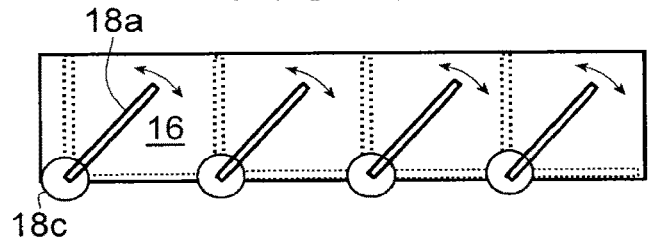
FIG. 3D is a schematic view of an outlet of the airflow passages as viewed from the lateral side of the vehicle, FIG. 3D illustrating a structure for actively opening and closing airflow passages in one embodiment of the present disclosure, and FIG. 3D illustrating the structure in which fins pivot about their pivot axes to adjust the open-close state of the airflow passages and the orientation of the fins.

As illustrated in FIG. 3D, variable fins 18a of which the angle is variably adjustable may be used as a structure for actively closing the airflow passages 16 according to another embodiment of the present disclosure. The fins 18a are configured to define the airflow passages 16. In this case, the direction of a wind impinging on the vehicle is detected in the same manner as that in the case of FIG. 3B and FIG. 3C, and the variable fins 18a are pivoted about pivot axes 18c by, for example, an electric motor. When the variable fins 18a are located on the windward side, the variable fins 18a may be moved to the horizontal positions in FIG. 3D to close the airflow passages 16, whereas when the variable fins 18a are located on the leeward side, the variable fins 18a may be moved to desired angular positions between the vertical positions (indicated by the broken lines) and the horizontal positions in FIG. 3D. Because the direction of an airflow flowing out of the outlet 20 is changed based on the angle of the variable fins 18a, the angle of the variable fins 18a may be set as needed based on which of the lift reducing effect and the generation of anti-yaw moment deserves a higher priority.

To verify the effect of the embodiments of the present disclosure described above, the aerodynamic characteristics of a test vehicle disposed on a load cell in a wind tunnel were checked. In the measurement, aerodynamic coefficients in first to fourth states were calculated. In the first state, the airflow passages on both sides of the vehicle were closed under a condition that a wind headed in the front-rear direction (heading straight) was applied to the vehicle and under a condition that a crosswind (with a yaw angle of 30°) was applied to the vehicle. In the second state, only the airflow passages on the windward side of the vehicle were opened under the same conditions as those in the first state. In the third state, only the airflow passages on the leeward side of the vehicle were opened under the same conditions as those in the first state. In the fourth state, the airflow passages on both sides of the vehicle were opened under the same conditions as those in the first state. The angle of an airflow flowing out of the airflow passages to the outside of the vehicle was 30° (−30 degrees in FIG. 4) as measured from the rear side of the vehicle.

According to the result of this test, in the case where the vehicle was travelling straight, when the airflow passages on the vehicle-body lateral side were opened, lift CLR on the rear side was slightly increased (due to outflow of a small amount of airflow from the vehicle-body side surface), but little influence was found on other aerodynamic coefficients. On the other hand, regarding the aerodynamic coefficients under a crosswind condition, whether or not the airflow passages were opened had little influence on drag CD (resistance), while opening the airflow passages caused a decrease in lateral force CS. Regarding lift (force in the upper-lower direction) CL, opening only the airflow passages on the leeward side caused a decrease in the value of lift CL. Thus, it was confirmed that the effect of reducing lift was obtained by the present disclosure. Note that, in the case of this test vehicle, the effect of reducing turning yaw moment CY toward the leeward side was found when only the airflow passages on the windward side were opened. An increase in lift CL was found when only the airflow passages on the windward side were opened. Lift CL on each of the test vehicles having other shapes, which was measured in a wind tunnel test similar to the foregoing test, was reduced in the following order.

Shape A: (both sides closed)>(both sides open)>(leeward side open)
Shape B: (both sides closed)>(both sides open)>(leeward side open)
Shape C: (both sides closed)>(both sides open)>(leeward side open)

According to the result of this test, it was confirmed that, in all the cases, an enhanced effect of reducing lift was obtained when only the airflow passages on the leeward side were opened. In the case of Shape A, when an airflow from the front side of the vehicle body is taken into the vehicle-body underfloor space, lift CL was significantly reduced.

Figure 4:
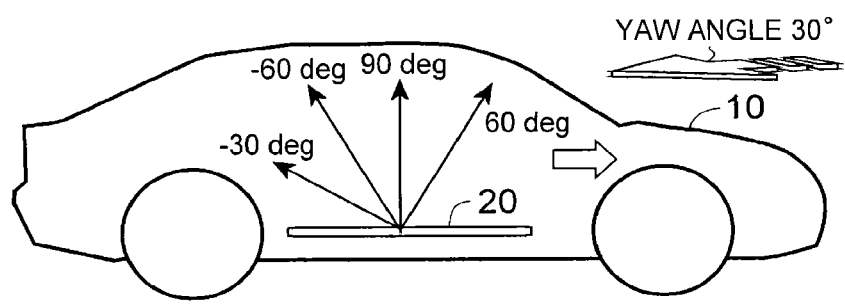
FIG. 4 is a schematic side view of the vehicle on which the effect of the embodiments of the present disclosure is verified, FIG. 4 illustrating the directions of airflows that are caused to flow out of an outlet when a crosswind with a yaw angle of 30° is applied to the vehicle.

Next, as illustrated in FIG. 4, in a wind tunnel test similar to the foregoing test, in the presence of an airflow with a yaw angle of 30°, changes in the aerodynamic coefficients due to the outflow angle of the airflow were examined at various angles of the airflow discharged from the airflow passages to the outside of the vehicle. As a result, the value of lift was smallest, hence the effect of reducing lift was largest, when the outflow angle of the airflow was 90°, that is, when the airflow was discharged substantially vertically upward. Further, the value of turning yaw moment toward the leeward side was smallest, hence the effect of anti-yaw moment was largest, when the outflow angle of the airflow was −30°, that is, when the airflow was discharged toward the rear of the vehicle.

As described so far, according to the embodiments of the present disclosure, the extending direction of each airflow passage from the vehicle-body underfloor space toward the vehicle-body side surface is inclined toward the rear of the vehicle. With this structure, when the vehicle in motion receives a crosswind, the air more reliably flows out (escapes) from the vehicle-body underfloor space to the outside of the vehicle on the leeward side in the direction of the crosswind. As a result, the effect of reducing lift exerted on the vehicle body is enhanced. This effect becomes more remarkable when the airflow passages on the windward side are closed.

The embodiments of the present disclosure have been described above. It should be noted that the present disclosure is not limited to the example embodiments described above, and the embodiments of the present disclosure may be modified as needed. For example, each of the configurations shown in FIGS. 1A to 1D is applicable to any of the configurations shown in FIGS. 3A to 3D.

What is claimed is:

1. A vehicle having vehicle-body side surfaces provided with airflow passages, the vehicle comprising:
   front wheels;
   rear wheels;
   a vehicle body including vehicle-body side surfaces each provided with an airflow passage, the airflow passage being in a lower portion of the respective vehicle-body side surface, the lower portion being between a corresponding one of the front wheels and a corresponding one of the rear wheels, and the airflow passage extending from an underfloor space located below the vehicle body, to the vehicle-body side surface; and
   closure mechanisms each configured to close the airflow passage of a corresponding one of the vehicle-body side surfaces that receives a crosswind while the vehicle is in motion, wherein an extending direction of the airflow passage extending from the underfloor space toward the vehicle-body side surface is inclined toward a rear of the vehicle.

2. The vehicle according to claim 1, wherein
the airflow passage has a tubular structure that passes through the vehicle body from the underfloor space to the vehicle-body side surface, the tubular structure having an opening that extends in a front-rear direction of the vehicle,
the airflow passage includes a fin extending in an up-down direction of the vehicle,
a direction in which the fin extends from the underfloor space toward the vehicle-body side surface is inclined toward the rear of the vehicle, and
a space inside the tubular structure is partitioned by the fin.

3. The vehicle according to claim 1, wherein
the airflow passage has a tubular structure that passes through the vehicle body from the underfloor space to the vehicle-body side surface, and
a direction in which the tubular structure extends from the underfloor space toward the vehicle-body side surface is inclined toward the rear of the vehicle.

4. The vehicle according to claim 1, wherein
an area of a section of an airflow in the underfloor space is larger than an opening area of the airflow passage, the section of the airflow being perpendicular to a direction in which the airflow flows.

5. The vehicle according to claim 1, wherein
an outlet of the airflow passage is configured such that an airflow flowing out of the outlet flows substantially vertically upward in a side view of the vehicle.

6. The vehicle according to claim 1, wherein
an outlet of the airflow passage is configured such that an airflow flowing out of the outlet flows in a direction inclined toward the rear of the vehicle.

7. The vehicle according to claim 1, wherein
the airflow passage is configured such that an airflow flowing into the airflow passage from a front side of the vehicle flows out through flow passage.

8. The vehicle according to claim 1, wherein the airflow passage includes a plurality of fins that define spaces through which an airflow flows through the airflow passage.

9. The vehicle according to claim 8, wherein the closure mechanism rotates the fins of to a horizontal position to close the airflow passage of the corresponding one of the vehicle-body side surfaces that receives a crosswind.

10. The vehicle according to claim 1, wherein the closure mechanisms are shutters that close the airflow passage of the corresponding one of the vehicle-body side surfaces that receives a crosswind.

* * * * *